(12) United States Patent
Liu et al.

(10) Patent No.: US 7,892,079 B2
(45) Date of Patent: Feb. 22, 2011

(54) DETECT-POINT-CLICK (DPC) BASED GAMING SYSTEMS AND TECHNIQUES

(75) Inventors: Zicheng Liu, Bellevue, WA (US); Yong Rui, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1961 days.

(21) Appl. No.: 10/915,181

(22) Filed: Aug. 10, 2004

(65) Prior Publication Data
US 2006/0035709 A1 Feb. 16, 2006

(51) Int. Cl.
A63F 13/00 (2006.01)
(52) U.S. Cl. ............................................ 463/9; 463/33
(58) Field of Classification Search ............... 463/1, 463/9, 23, 33, 42
See application file for complete search history.

(56) References Cited

U.S. PATENT DOCUMENTS

| 5,740,243 | A  | * | 4/1998  | Rehm ........................... 380/1 |
| 6,072,496 | A  | * | 6/2000  | Guenter et al. .............. 345/419 |
| 6,352,479 | B1 | * | 3/2002  | Sparks, II ..................... 463/42 |
| 6,676,521 | B1 | * | 1/2004  | La Mura et al. .............. 463/42 |
| 7,040,622 | B2 | * | 5/2006  | Sebesta et al. .............. 273/236 |
| 7,130,454 | B1 | * | 10/2006 | Berube et al. ............... 382/118 |
| 7,258,614 | B1 | * | 8/2007  | Kates et al. .................. 463/42 |
| 2001/0040342 | A1 | * | 11/2001 | Matos .................... 273/157 R |
| 2002/0120853 | A1 | * | 8/2002  | Tyree .......................... 713/188 |
| 2004/0199597 | A1 | * | 10/2004 | Libbey et al. ............... 709/207 |
| 2005/0065802 | A1 | * | 3/2005  | Rui et al. ....................... 705/1 |

OTHER PUBLICATIONS http://www.liquidfuse.com, Photohunt!, webmaster@liquidfuse.com, Feb. 9, 2003.*
http://www.captcha.net, Carnegie Mellon, biglou@cs.cmu.edu, Jun. 6, 2003.*
Photohunt, archived at www.archive.org, archive date Sep. 25, 2003, available online at www.liquidfuse.com, 8 pages.*
Yong Rui, et al., ARTiFACIAL: Automated Reverse Turing Test Using Facial Features, MM'03, Nov. 2-8, 2003, pp. 295-298, Berkeley, California.

* cited by examiner

Primary Examiner—James S McClellan
(74) Attorney, Agent, or Firm—Lee & Hayes, PLLC

(57) ABSTRACT

Disclosed are a unique DPC (detect point click) based game system and method. The DPC based game system involves generating one or a plurality of DPC images, presenting them to a game participant, and collecting the participant's clicks (that identify which object in the DPC image the participant believes to be the correct DPC object), and determining whether the participant's clicks represent the correct object. DPC images can be created in part by selecting a base image, altering some portion of the base image to create at least one confusion image, mapping these images to a geometric model, and applying one or more distortion filters to at least one of the base or confusing image to obscure the DPC object from clear view. Locating the DPC object nearly hidden in the DPC image can advance the participant in the DPC based game or other game including DPC images as a part thereof.

23 Claims, 9 Drawing Sheets

FIRST IMAGE – BASE

SECOND IMAGE - CONFUSING

EXEMPLARY DPC IMAGE – WITH ADDED DISTORTION

EXEMPLARY DPC IMAGE – WITH ADDED DISTORTION

EXEMPLARY GEOMETRIC WIRE MODEL
(SUBSTANTIALLY ENLARGED TO SHOW WIRE DETAIL)

FIRST IMAGE – BASE
SECOND IMAGE – CONFUSING

DETECT-POINT-CLICK (DPC) BASED GAMING SYSTEMS AND TECHNIQUES

TECHNICAL FIELD

The present invention relates generally to human image recognition and in particular to generating images of varying difficulty levels on a computing device for user identification to facilitate user entertainment and/or education.

BACKGROUND OF THE INVENTION

Over the last decade, computer usage has increased exponentially among all ages of users for business, entertainment, as well as education. In more recent years, for example, computer-related gaming has risen dramatically in interest and popularity. This may be due in large part to the accessibility or availability of games. For example, nowadays, many different types of games can be downloaded or played on just about any type of computing device regardless of size. As a result of increasing demands and consumer expectations, game developers are constantly trying to produce more creative gaming systems that present higher quality graphics, more realistic character appearance and movements, and/or different types of challenge scenarios or obstacles for the user. Thus, there remains a need for more innovative gaming systems that enhance the user's experience.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and/or methodology that facilitate expanding and/or improving gaming experiences. In particular, the invention provides for a gaming system and methodology involving DPC (detect-point-click) image recognition and identification. For example, game participants can compete against one another in the identification of DPC images over a course of time or within a given time period in which speed in solving any one DPC image and/or quantity of DPC images solved can be factors when determining the victor of any particular game.

In one aspect of the present invention, a DPC image can be generated in part by mapping a composite image—comprising a base image and a confusion image—onto a geometric model to change the shape or orientation of the images. Alternatively, the base and confusing images can be mapped to the geometric model separately and then combined thereafter to form the DPC image.

The geometric model can be a one-, two-, three-, or multi-dimensional configuration. The composite image can be created in part by selecting at least one base image from a database and then fabricating a confusion image derived from the base image. For example, after the base or first image is selected, it can be stored in memory. Following, sub-regions of the base image can be selected and then "copied" to form the confusion image. The selected sub-regions can be altered, morphed, deformed, distorted, rearranged, or modified in some manner to create the confusion image. Multiple confusion images can be generated in this way such that a subset of them can be incorporated into one DPC image.

After mapping any image to at least one geometric model, any number or type of distortion filters can be applied to the oriented images. For example, the base image can be "distorted" in a different or same manner from the confusion image. Furthermore, distortion filters can be applied globally to any particular image or combinations of images (e.g., base, confusion, or composite image) or locally to at least one portion of any image to create the resulting DPC image. Exemplary types of distortion filters can affect orientation, lighting, shadowing, shading, contrast, texture, color, size, and/or patterns associated with at least a portion of an image (e.g., base, confusion, or composite image).

Despite the various amounts of distortion within a DPC image, the DPC image can include as few as one discernible image of an object or face. When incorporated into a gaming system, the user can be required to correctly recognize and identify the discernible image(s) before proceeding within the game.

According to another aspect of the invention, the gaming system can be employed alone by one or more users or in conjunction with other non-DPC based gaming systems. For example, one gaming option can involve identifying objects correctly from one or more DPC images. Another gaming option might include identifying the correct objects to reveal hidden clues or keys in addition to completing other tasks to advance through to the end of a virtual world game.

According to still another aspect of the invention, the selection and/or placement of DPC images in a scene can depend in part on a user's preference settings. Examples of such settings can include difficulty level, complexity, and/or type (e.g., education related or for fun) of DPC image. Other settings such as genre, color, number of players, etc. can be present as well.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
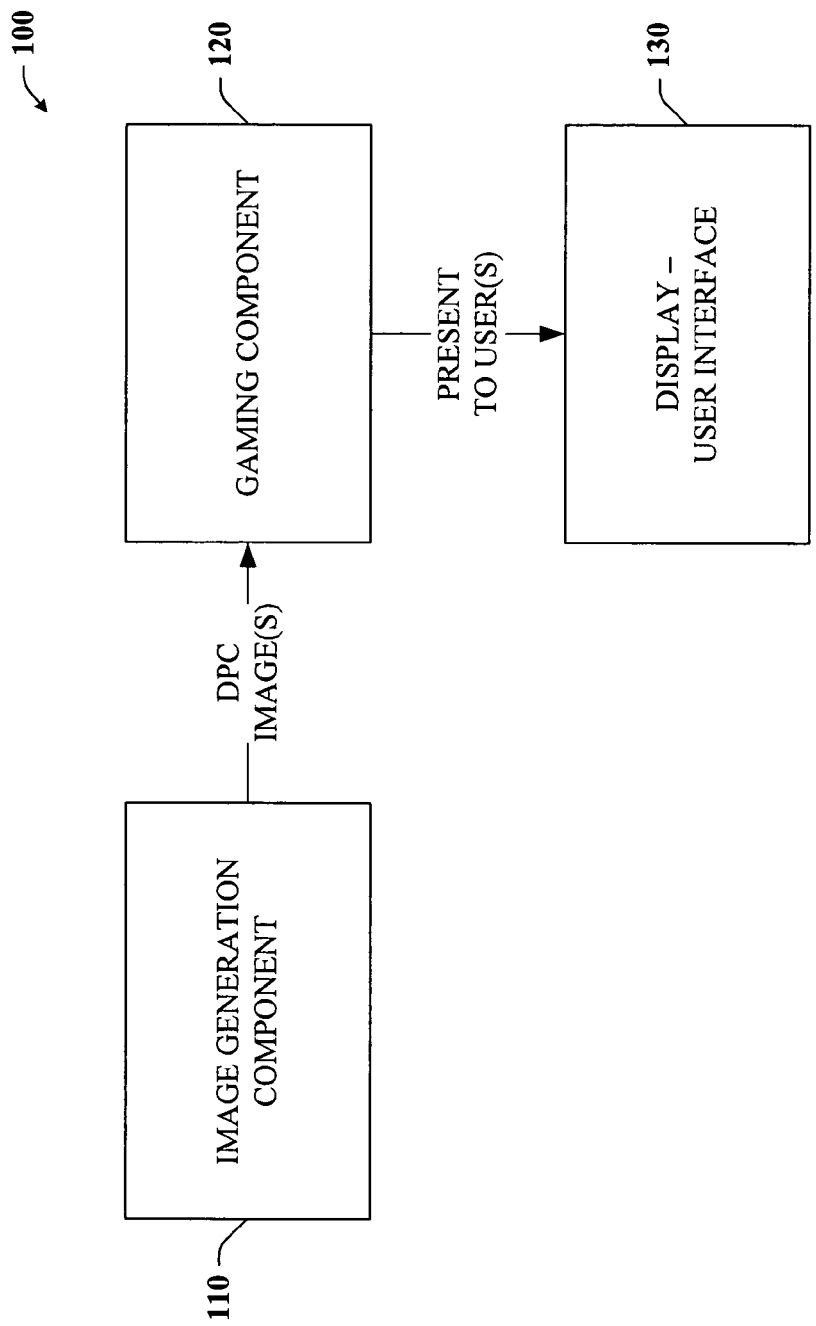
FIG. 1 is a high-level block diagram of a DPC gaming system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating a plurality of DPC images. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is a high-level block diagram of a DPC gaming system 100 in accordance with an aspect of the present invention. The gaming system 100 can comprise a DPC image generation component 110 that can generate a plurality of DPC images. Each DPC image can include at least one discernible DPC object such as a face (e.g., human or animal), animal, and/or shape (e.g., circle, triangle, square, character, letter, number, etc.). The DPC object can be at least partially obscured by other objects present in the DPC image that are confusingly similar to the at least one DPC object. For instance, the DPC image can also include portions of the DPC object arranged or positioned in a random manner around the DPC object. To make it even more difficult to identify or locate the DPC object, at least one region of the DPC image may be obscured or modified. A more detailed discussion of the generation of DPC images can be found below in FIG. 2.

As DPC images are generated, they can be stored for use by or communicated to a gaming component 120. The gaming component 120 can position or arrange one or more selected DPC images on a user interface or display 130, whereupon one or more users can interact with such images. For example, at least a subset of DPC images can be presented to multiple participants of an online DPC game, wherein each participant tries to correctly identify or locate as many DPC objects as possible. Alternatively, the DPC images can be used in combination with other types of games. For instance, participants may be asked or required to "solve" a DPC image to find clues or to advance through to a different level of play.

Though not shown in the figure, an artificial intelligence (AI) component can be employed in the generation of DPC images as well as in the positioning of them in a game environment. The AI component can facilitate optimizing the effectiveness of DPC images at prescribed difficulty levels by monitoring or collecting participant feedback. Such feedback can include participant clicks when attempting to solve particular DPC images and/or actual comments from the participants or other game developers. Moreover, the participant's game experience can be improved overall updating or adjusting the image generation component 110 based on user experiences.

Figure 2:
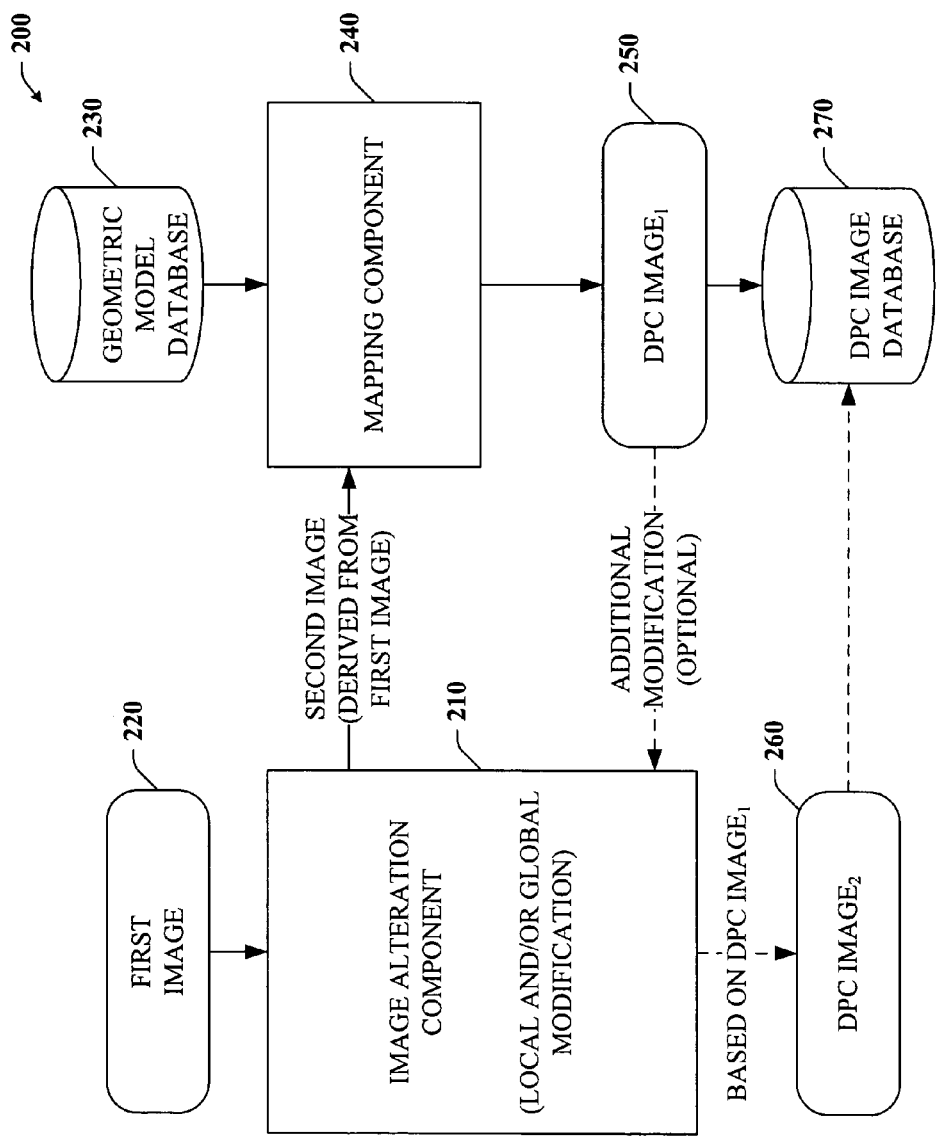
FIG. 2 is a block diagram of a DPC gaming system that facilitates generating DPC images in accordance with an aspect of the present invention.

Turning now to FIG. 2, there is illustrated a DPC image system 200 that facilitates generating DPC images for use in educational or entertainment game systems. The image system 200 comprises an image alteration component 210 that can alter an image of an object (e.g., first image 220) in a global or local manner depending on the desired modification, to thus yield additional images based on the first image (220). In practice, for example, imagine that a first image 220 is chosen. The first image 220 may be modified or altered in whole or in part if desired. Thereafter, one or more portions of the first image are selected and then altered or rearranged by the image alteration component 210 to create at least a second image that is confusingly similar to the first image. The second image can be further modified at this time if desired.

Though not depicted in the figure, the image alteration component 210 can include a plurality of sub-components or distortion filters that are responsible for modifying such characteristics of any image such as color, shadows, lighting, contrast, sharpness, smoothness, texture, and/or orientation or shading. In fact, one or more distortion filters can be adjusted to increase or decrease the overall difficulty of a particular DPC image or game (e.g., a subset of DPC images).

Once the second image is produced and/or altered, it can be mapped to a geometric model selected from a geometric model database 230—by way of a mapping component 240—to facilitate forming a DPC $\text{IMAGE}_1$ 250. The geometric model selected from the database 230 can be a one-dimensional (1D), two dimensional (2D), three dimensional (3D), or multi-dimensional model. The geometric model can essentially determine the layout or shape of the second image. For example, when mapped to a particular model, the second image can appear to be oriented in a different position. In one instance, the second image can appear in 3D. Alternatively, some portions of the image may appear in 1D while other portions may appear in 3D.

Additional images that are confusingly similar to the first image 220 can be created in the above manner and then used to create the DPC $\text{IMAGE}_1$ 250. The DPC $\text{IMAGE}_1$ 250 can be stored in a DPC image database 260 for later retrieval or use. Alternatively, however, the DPC $\text{IMAGE}_1$ 250 can undergo further modification by the image alteration component 210. In one approach, the image alteration component 220 can modify at least one portion of the DPC $\text{IMAGE}_1$ 250, thereby making it more difficult to locate the correct DPC object (e.g., human face). In another approach, the DPC $\text{IMAGE}_1$ 250 can be randomly divided into sections. At least a subset of these sections can then be randomly rearranged to form a new DPC image (e.g., DPC $\text{IMAGE}_2$ 270). For example, imagine that a human face comprising two eyes, a nose, and a mouth is the DPC object in the DPC image 250. The DPC $\text{IMAGE}_1$ 250 may comprise the human face surrounded by other randomly positioned noses, mouths, and eyes. By dividing the DPC $\text{IMAGE}_1$ 250 into sections and then rearranging some of those sections, the resulting new DPC $\text{IMAGE}_2$ 270 can appear to be more distorted and/or more confusing to the user (e.g., game participant). As a result, locating the correct human face may be more challenging for the user.

DPC images can also be ranked or rated according to their difficulty and then grouped accordingly in the database 270 or in a plurality of databases (not shown). The rating of a DPC image can be based in part on the number or type of distortion filters employed to create the final DPC image. Other algorithmic operations can be performed as well to determine an image's difficulty rating.

Figure 5:
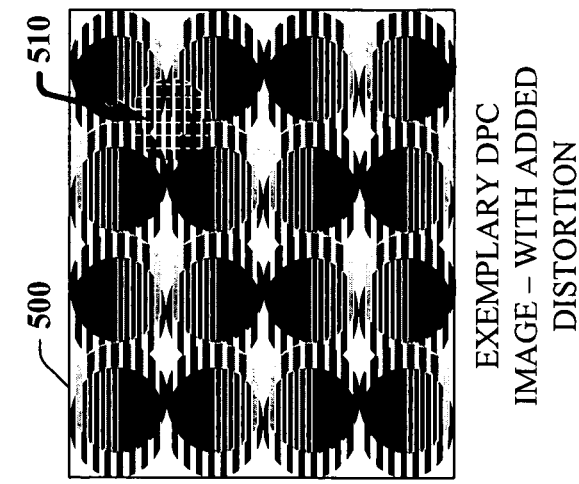
FIGS. 3-5 are exemplary block diagrams that provide a schematic illustration of DPC image generation in accordance with an aspect of the present invention.
Figure 4:
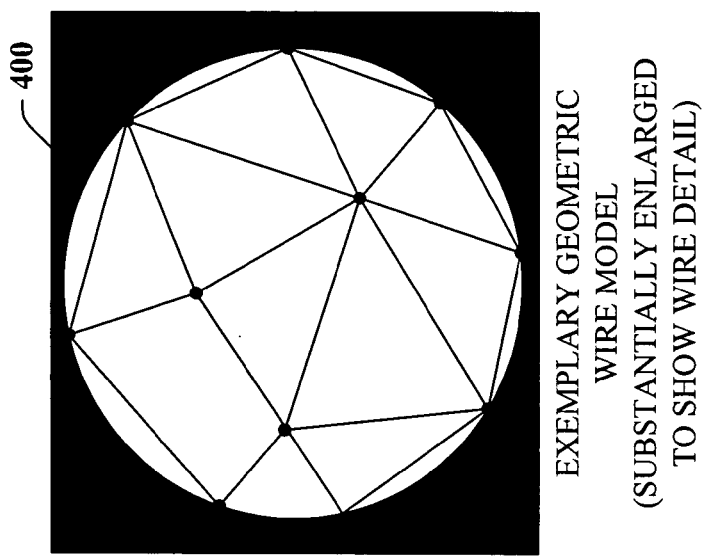
Figure 3:
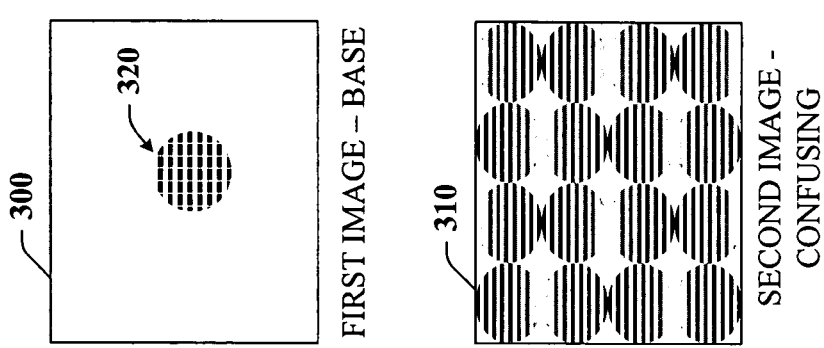

Fabricating a DPC image in accordance with an aspect of the present invention may be better understood from the diagrams depicted in FIGS. 3, 4, and 5. By way of example, FIGS. 3, 4, and 5 illustrate the generation of an exemplary DPC image. In FIG. 3, a first image 300 and at least a second image 310 are shown. The first image 300 (base image) comprises a DPC object 320. The second image 310 can be formed by selecting one or more sub-regions of the first image 300, altering them if desired, and then arranging these selected regions in a random or nonsensical manner to create a new image (confusion image) that is confusingly similar to some aspect of the first image 300. This can be repeated to yield multiple confusion images—all of which are derived from the first image 300. The images 300, 310 may also be altered or modified in some way from their original appearance.

Following, the first image 300 and second image 310 can then be individually mapped to an exemplary geometric model 400 illustrated in FIG. 4. This mapping can facilitate defining the orientation of the first and second images. As a result, the shape of the first image 300 can be similar to the shape of the second image 310, thereby adding even more confusion to the final DPC image. It should be appreciated that the scale of the geometric model 400 has been greatly exaggerated to view the wire detail of the model.

As seen in FIG. 5, an exemplary DPC image 500 can be formed from arranging and/or layering a plurality of confusion images derived from the first image around the first image. DPC-based games make use of the DPC images by requiring participants to "solve" the images by correctly locating the respective DPC object (e.g., DPC object 320 in FIG. 3, supra) in order to progress through and/or win the game.

Figure 6:
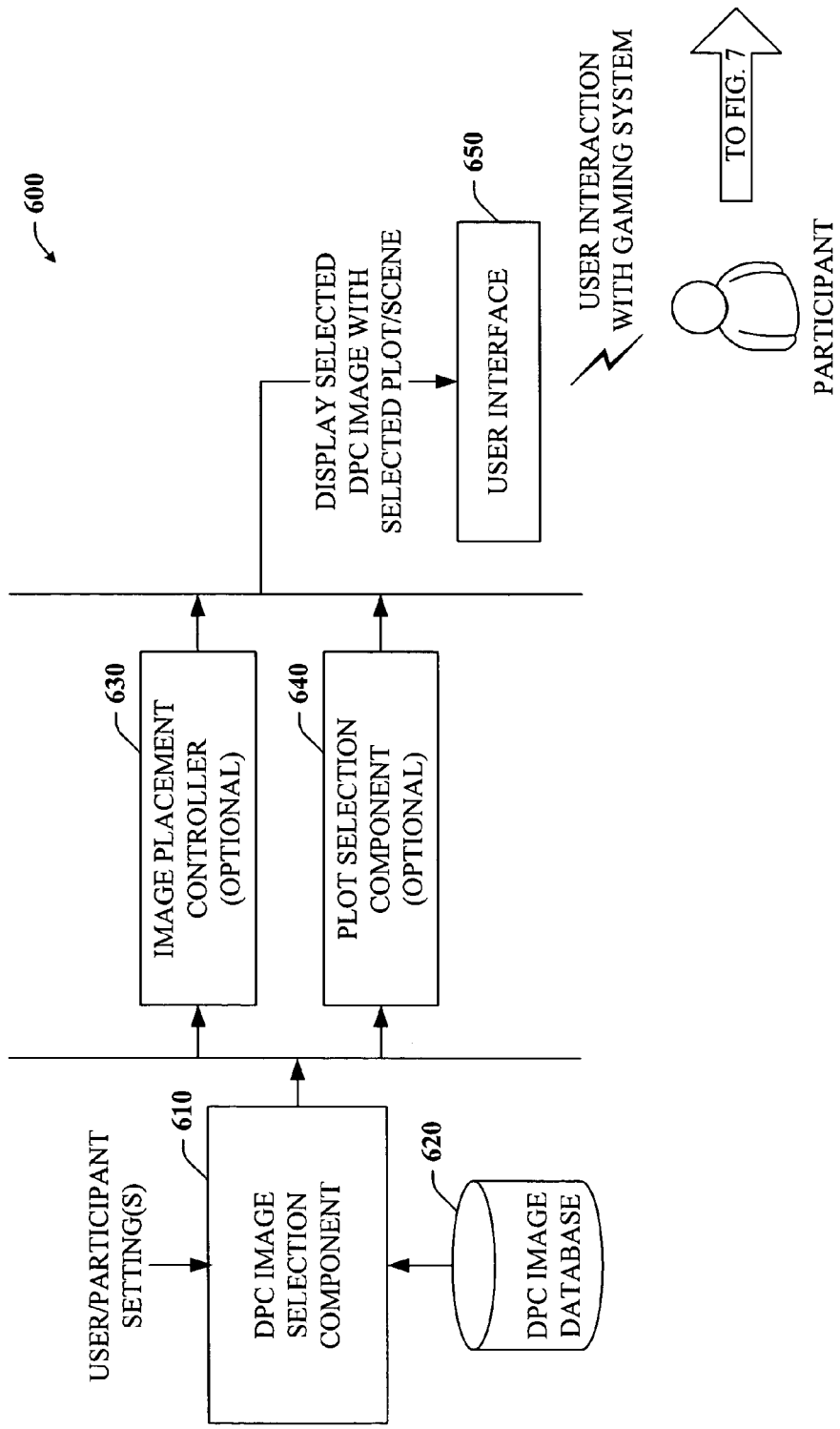
FIG. 6 is a block diagram of a DPC gaming system in accordance with an aspect of the present invention.

Referring now to FIG. 6, there is illustrated a DPC gaming system 600 that can be used for enjoyment or for learning by one or multiple participants connected to the system 600 via an internet or other network connection. The gaming system 600 comprises a DPC image selection component 610 that can receive a participant's setting preferences such as desired difficulty level, desired game type, number of participants, resume game, new game, and the like. Based at least in part on the participant's preferences, the DPC image selection component can retrieve a plurality of DPC images from a DPC image database 620.

Optionally, the selected DPC images can be positioned within a scene or within a display space via an image placement controller 630 to optimize the participant's gaming experience. The placement of the images can be based on a selected plot (optionally chosen by a plot selection component 640). For example, if placed within a murder mystery game scene, the DPC images can be strategically located throughout the scene according to the particular story line. In addition, clues or other types of valuable information can be associated with the DPC images. Hence, when a DPC image is "solved" correctly, a piece of information (e.g., hint, bonus, etc) can be revealed to the participant. Furthermore, the gaming system 600 can be programmed to provide more useful information or "better prizes" when the more difficult DPC images are solved.

The selected DPC images can then be displayed accordingly on a user interface 650 of any type of computing device such as a personal computer, laptop, personal digital assistant (PDA), smart phone, cellular phone, watch, television, and the like. Once displayed, the participant can interact with the DPC images such as by playing a DPC image game or by "solving" DPC images as part of a virtual world or other kind of game.

Figure 7:
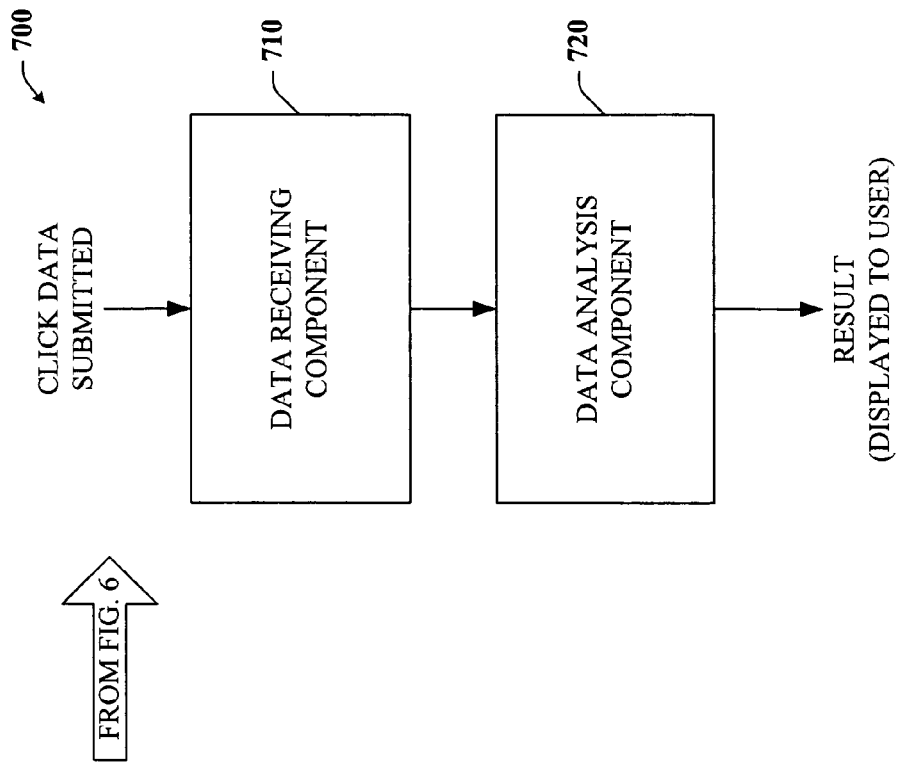
FIG. 7 is a block diagram of additional portions of the DPC gaming system from FIG. 3 that facilitate determining whether the user has correctly identified one or more objects in at least one DPC image in accordance with still another aspect of the present invention.

In FIG. 7, there is illustrated an input verification or scoring system 700 that can be included in a DPC game system (e.g., systems 100 and 600 in FIGS. 1 and 6, respectively) to facilitate determining whether a participant has correctly identified or located the DPC object. In particular, the participant can detect the location of the object, click on the prescribed data points to identify the object, and then submit the data to a data receiving component 710. For example, imagine that the object to be located is a face. The participant may be instructed to click once on each eye, the nose, and the mouth. The data receiving component 710 communicates the click data to a data analysis component 720 that can determine whether the submitted data points match to the correct face in the image. The result (e.g., correct or incorrect) may be displayed to the participant.

Furthermore, various rules can be employed to guide user interactions involving DPC images. For example, participants can be restricted or barred from re-attempting to solve a "missed" DPC image. Rather, a new DPC image can populate and replace the missed image. In addition, points or valuable information collected through the course of the game can be lost or deducted for missed DPC images. A wide variety of other guidelines can be employed as well according to the nature of game being played. For instance, the speed at which a user can solve any particular DPC image can be a factor to determine the winner in a multi-participant game scenario. Therefore, a first participant who solves DPC image Mermaid in the least amount of time can "win" that image, thus earning a set number of points. If solving the mermaid image is the game, then the first participant can be declared the winner. Alternatively or additionally, incorrectly solved DPC images or the total number of solved DPC images can affect each participant's score or status.

Various methodologies in accordance with the subject invention will now be described via a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 8:
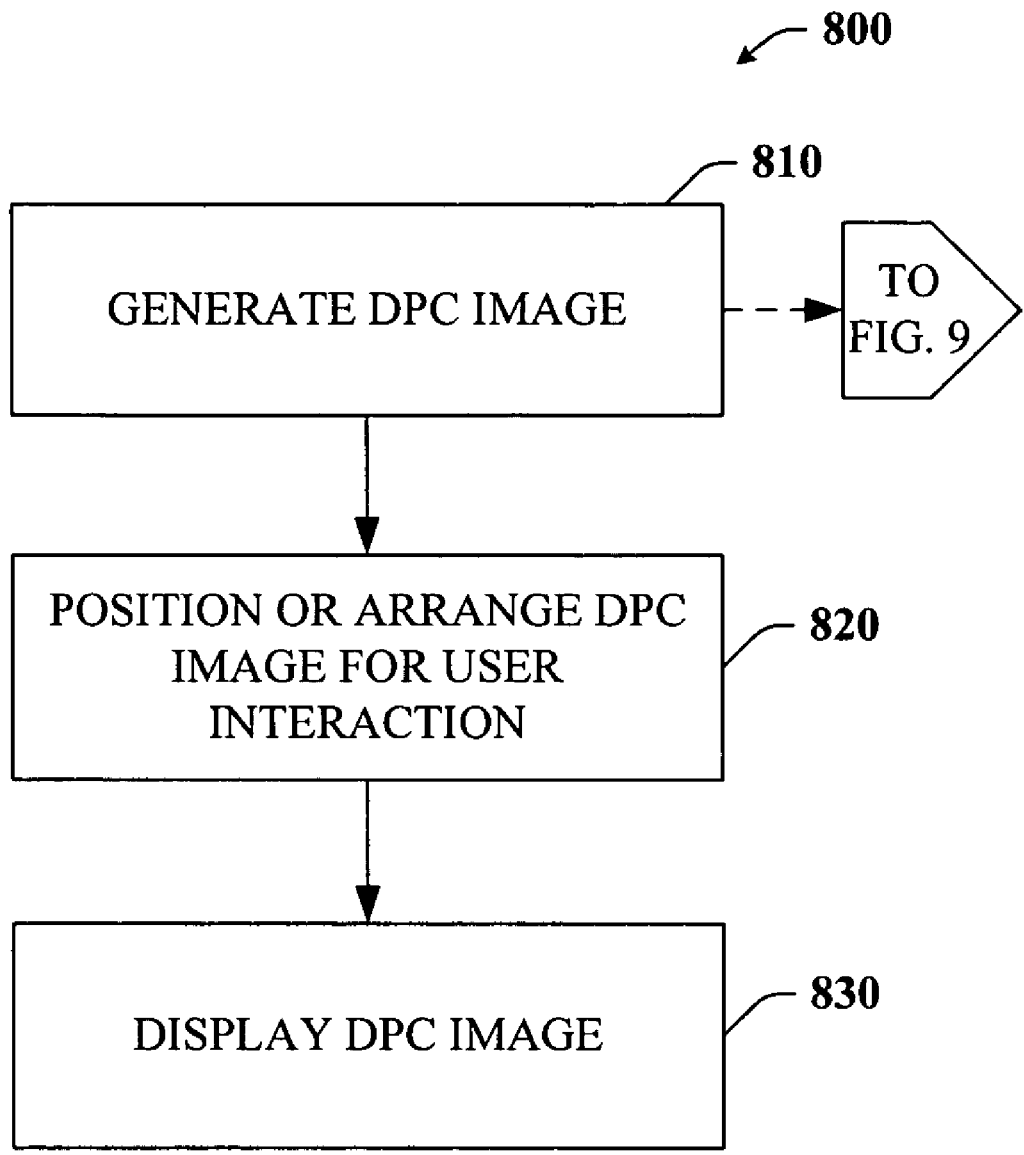
FIG. 8 is a flow chart illustrating an exemplary gaming methodology involving generating and solving DPC images in accordance with an aspect of the present invention.
Figure 9:
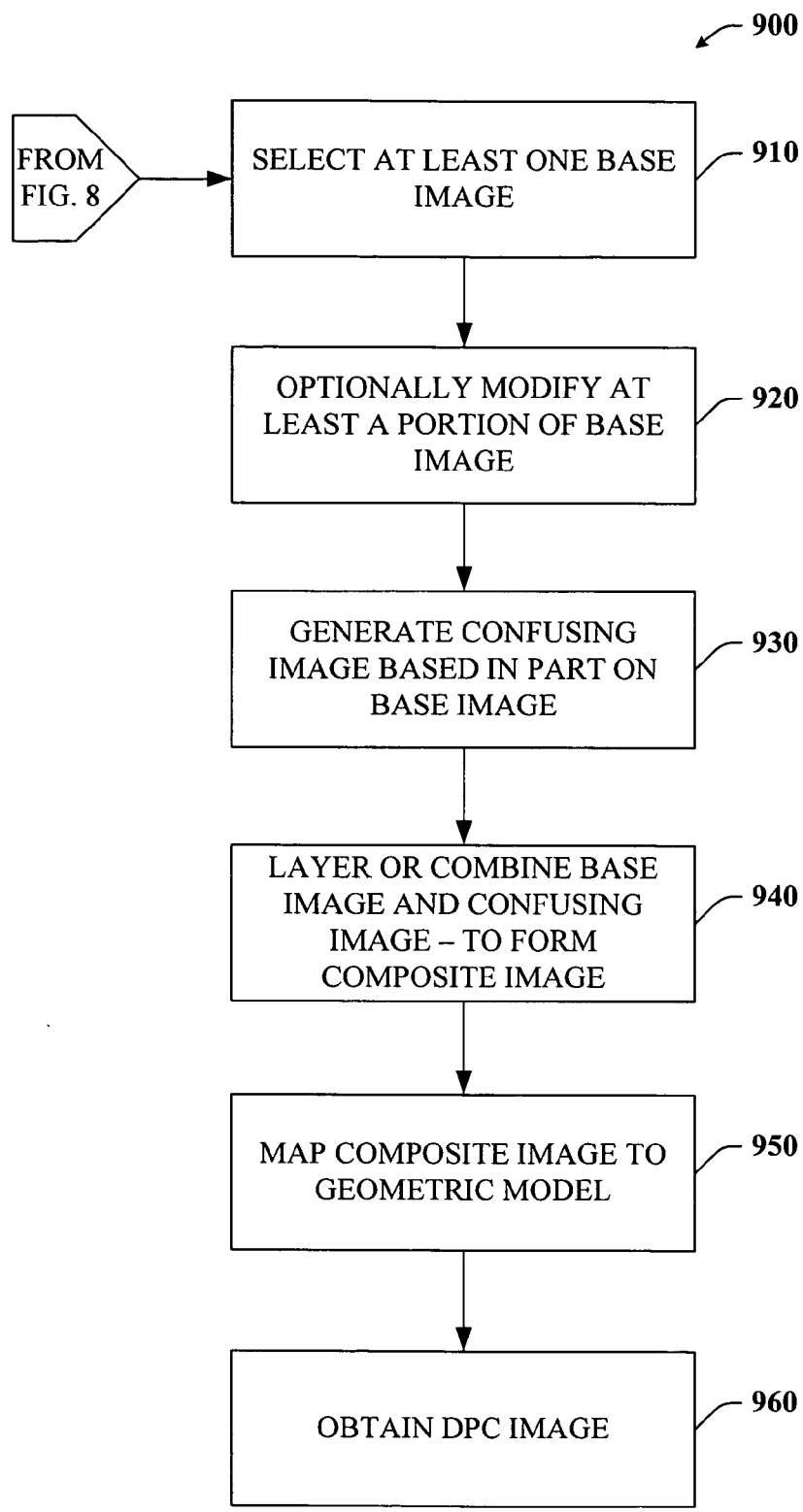
FIG. 9 is a flow chart illustrating an exemplary gaming methodology that facilitates generating DPC images in accordance with an aspect of the present invention.

Referring now to FIG. 8, there is a flow diagram of an exemplary process 800 that facilitates interacting with a DPC based game system in accordance with an aspect of the present invention. The process 800 involves generating at least one DPC image at 810 and then positioning or arranging the at least one image on a user interface for user interaction at 820. FIG. 9, infra, discusses DPC image generation in greater detail. At 830, the image(s) can be displayed to the user in the context of a game.

Turning to FIG. 9, there is a flow diagram of an exemplary process 900 that facilitates generating DPC images for use in a DPC based game system. The process 900 involves selecting at least one base or first image at 910. The base image comprises a focal object (e.g., DPC object) which can be selected from an image database having arbitrary objects such as shapes, animals, faces, patterns, blocks, and the like stored therein. At 920, the base image, or at least a portion thereof, can be modified such as to alter or exaggerate the appearance of the image. For example, the lighting, shape, size, and/or texture of at least a portion of the image can be adjusted or modified to distort or deform that portion of the image.

Following at 930, one or more confusion images can be created based on the focal object of the base image. For example, sub-regions of the base image can be at least partially rearranged to create a new image that is confusingly similar to the focal object. Each confusion image may contain different parts of the focal object arranged in a nonsensical manner such that the parts no longer look like the focal object. In practice, for example, imagine that the focal object is a face. To create the confusion image, parts of the face can be randomly rearranged. As a result, the face no longer resembles a face. Instead, for example, the image appears as a jumble of eyes juxtaposed to a mouth which is juxtaposed to an eye and then a nose below the eye and a mouth next to the nose.

The base and confusion images can be combined or layered at 940 to form a plurality of composite images. Each composite image can undergo further distortion or modification if desired. Subsequently, the composite images can be individually mapped to a geometric model at 950 to orient or change the shape of such images. The geometric model can be a 1-D, 2-D, 3-D, or multi-dimensional shape. Alternatively, the base and confusion images can be individually mapped to the geometric model and then subsequently combined to form a composite DPC image.

Additional modification can be performed on desired portions of the resulting DPC image provided that the focal object is maintained and not completely obscured from detection. The DPC images can be employed as a game itself or as an integral part of other types of games such as virtual world or educational games.

Figure 10:
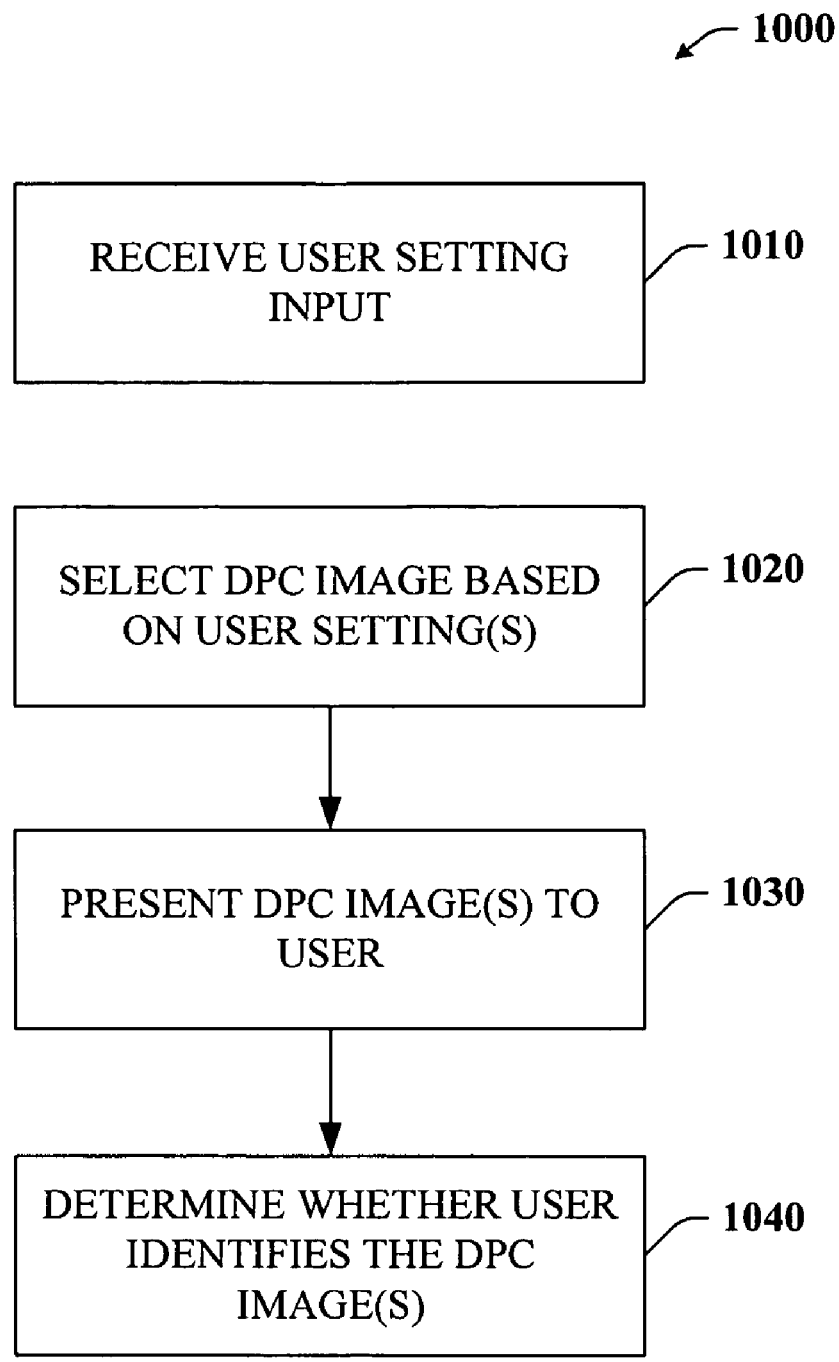
FIG. 10 is a flow chart illustrating an exemplary gaming methodology for interacting with a DPC gaming system in accordance with an aspect of the present invention.

Referring now to FIG. 10, there is a flow diagram of an exemplary process 1000 that facilitates user interaction with a DPC game system in accordance with an aspect of the present invention. The process 1000 comprises receiving a user's (e.g., participant's) setting preferences with respect to playing any DPC-based games at 1010. At 1020, at least a subset of DPC images can be selected and/or downloaded based in part on the user's settings. For example, if the user selected to play an educational DPC game at a difficulty level of 5, then educational DPC images rated with a difficulty level of 5 can be uploaded to the user's computing device and presented to the user at 1030. When the user locates the prescribed DPC object(s), the user can click on the object as instructed. The user's click(s) can then be submitted for analysis to determine whether the user has correctly identified the DPC object(s) at 1040.

Figure 11:
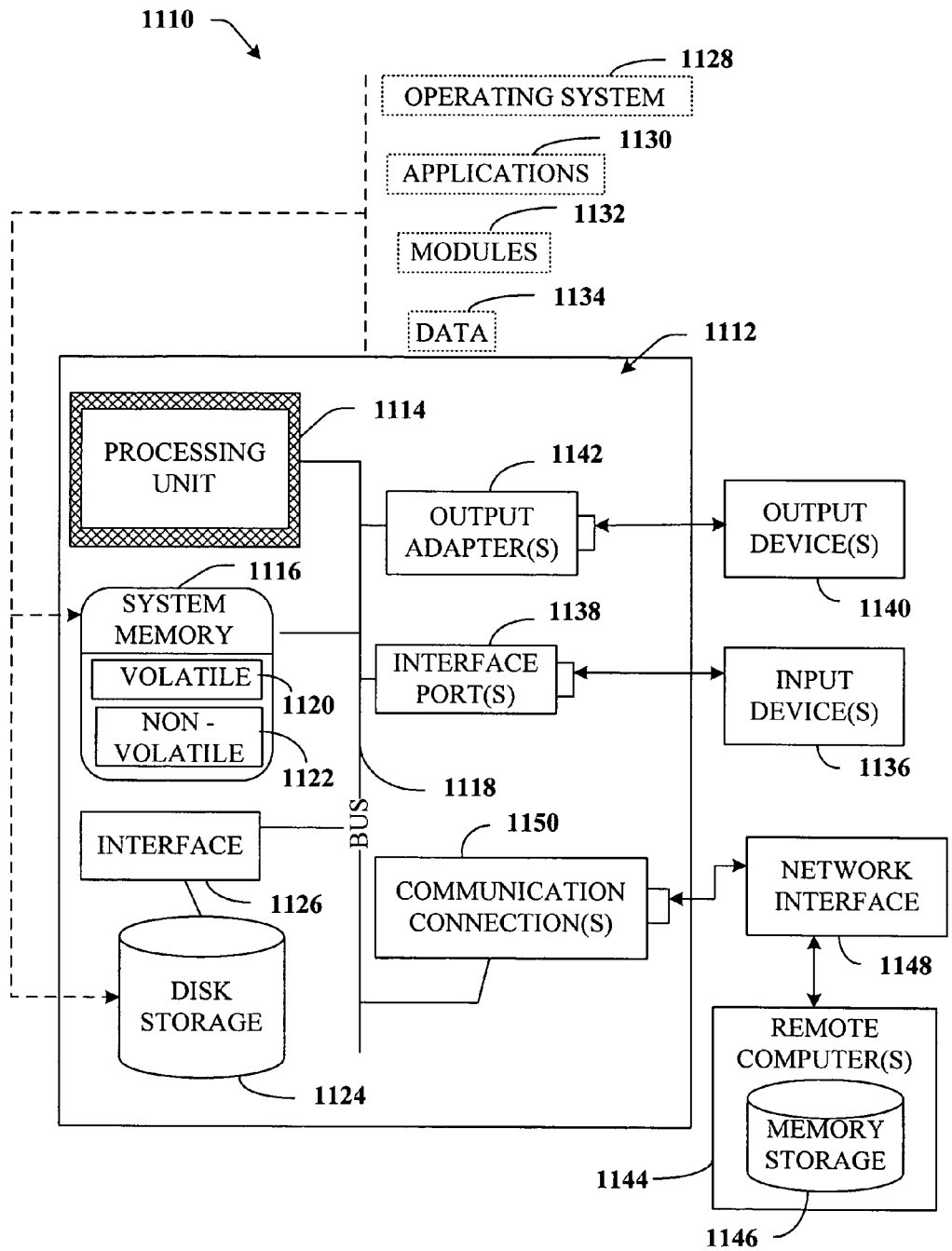
FIG. 11 illustrates an exemplary environment for implementing various aspects of the invention.

In order to provide additional context for various aspects of the present invention, FIG. 11 and the following discussion are intended to provide a brief, general description of a suitable operating environment 1110 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A detect-point-click (DPC) based game system comprising:
    a processor;
    a memory communicatively coupled to the processor, the memory comprising components including:
        an image generation component that creates a DPC image, the DPC image comprising a DPC object and a plurality of other objects partially obscuring the DPC object, the plurality of other objects being confusingly similar to the DPC object, the image generation component comprising:
            an image alteration component that modifies the DPC object to create the plurality of other objects and arrange the other objects in a random or nonsensical manner around the DPC object within the DPC image; and
        a gaming component that positions the DPC image on a gaming interface for human identification as part of a DPC-based game involving at least one participant.

2. The system of claim 1, wherein the image alteration component locally modifies at least one of the following: at least a portion of the DPC object or at least a portion of the other objects.

3. The system of claim 1, wherein the image alteration component globally modifies at least one of the following: the DPC object, the other objects, or the DPC image.

4. The system of claim 1, wherein the image alteration component modifies at least a portion of the DPC object by adjusting at least one of the following: lighting, shadowing, contrast, color, color scheme, texture, size, and shading to influence an overall appearance and to impact a difficulty level of the DPC image.

5. The system of claim 1, wherein the image generation component creates the DPC image in part by randomly selecting the DPC object to be included in a first image and creating at least a second image derived from and confusingly similar to the first image.

6. The system of claim 4, wherein the image generation component further comprises a mapping component that maps the first and second images to a geometric model.

7. The system of claim 6, wherein the geometric model is any one of the following: two dimensional, three dimensional and multi-dimensional models.

8. The system of claim 1, wherein the DPC object comprises at least one random object.

9. The system of claim 1, further comprising:
a data receiving component that receives participant "click" input to facilitate determining whether the participant has identified the DPC object within the DPC image; and
a component that provides additional information to players when the DPC object is correctly identified.

10. The system of claim 9, the additional information comprises at least one of a clue, a hint, or points.

11. The system of claim 1, wherein the positioning of the DPC image on a user interface is based at least in part upon game-based preferences.

12. The system of claim 1, further comprising a component that advances a participant through the DPC-based game based at least in part on a number correctly identified DPC objects.

13. The system of claim 1 is online and available to a plurality of users and/or game subscribers wherein multiple participants interact with the DPC-based game at the same time when online or connected to a network.

14. The system of claim 1, wherein the DPC image comprise one or more facial images.

15. The system of claim 14, wherein the one or more facial images comprise at least one of human faces, non-human faces, and non-photorealistic facial images.

16. The system of claim 1, wherein the DPC image comprise nonphotorealistic images.

17. A computer-implemented DPC-based game method comprising:
selecting a base object;
modifying the base object to create a plurality of confusion objects, the plurality of confusion objects confusingly similar to the base object, with a subset of the plurality of the confusion objects differing from remaining confusion objects of the plurality of confusion objects;
compositing the base object with the plurality of confusion objects to form a DPC image by arranging the plurality of confusion objects in a random or nonsensical manner within the DPC image;
positioning the DPC image on a user interface for participant interaction; and
collecting participant click data submitted for the DPC image to facilitate determining whether the participant has correctly identified the base object located in the DPC image.

18. The method of claim 17, wherein generating a plurality of DPC images comprises:
mapping the base object and the at least one confusion object to at least one geometric model; and
applying one or more distortion filters to at least a portion of the base object.

19. The method of claim 17, wherein the participant click data submitted for the DPC image comprises a count of time elapsed to submit or solve the DPC image.

20. The method of claim 17 further comprising revealing game related clues when the DPC image is "solved" by the participant to facilitate the participant's advancement through a non-DPC based game.

21. A DPC-based game system comprising:
a processor;
a memory communicatively coupled to the processor, the memory comprising components including:
an image generation component that selects a base object, the image generation component further comprising:
an image alteration component that modifies the base object to create a plurality of confusion objects and compositing the base object with the plurality of confusion objects to form a DPC image by arranging the plurality of confusion objects in a random or nonsensical manner about the base object;
an image placement controller that positions the DPC image on a user interface for participant interaction; and
a scoring component that collects participant click data submitted for the DPC image to facilitate determining whether the participant has correctly identified the base object located in the DPC image.

22. A computer readable medium comprising the computer executable components of claim 1.

23. A computer-implemented DPC-based game method comprising:
selecting a base object;
modifying the base object to create a confusion object, the confusion object confusingly similar to the base object;
multiplying the confusion object to create a plurality of confusion objects;
compositing the base object with the plurality of confusion objects to form a DPC image by arranging the plurality of confusion objects in a random or nonsensical manner within the DPC image;
positioning the DPC image on a user interface for participant interaction; and
collecting participant click data submitted for the DPC image to facilitate determining whether the participant has correctly identified the base object located in the DPC image.

* * * * *